United States Patent [19]

Hammond

[11] Patent Number: 5,153,019

[45] Date of Patent: Oct. 6, 1992

[54] RICE BRAN-HONEY BASED BEVERAGE PRODUCT AND PROCESS FOR MAKING SAME

[75] Inventor: Neal A. Hammond, Baton Rouge, La.

[73] Assignee: University Research & Marketing, Inc., Baton Rouge, La.

[21] Appl. No.: 707,468

[22] Filed: May 30, 1991

[51] Int. Cl.$^5$ .......................... A23L 2/02; A23L 1/08; A23C 9/20
[52] U.S. Cl. .................................... 426/590; 426/548; 426/580; 426/583; 426/584; 426/615; 426/616; 426/619; 426/658
[58] Field of Search ............... 426/580, 583, 590, 584, 426/634, 616, 615, 619, 548, 658

[56] References Cited

U.S. PATENT DOCUMENTS

| | | | |
|---|---|---|---|
| 1,631,830 | 6/1927 | Negly et al. | 426/590 |
| 3,949,098 | 4/1976 | Bangert | 426/590 |
| 4,200,662 | 4/1980 | Scibelli | 426/590 |
| 4,619,831 | 10/1986 | Sharma | 426/93 |
| 4,790,998 | 12/1988 | Swartz | 426/590 |

*Primary Examiner*—Jeanette Hunter
*Assistant Examiner*—Helen Pratt
*Attorney, Agent, or Firm*—William David Kiesel; Robert C. Tucker; Henry E. Naylor

[57] ABSTRACT

A beverage product comprised of rice bran; honey which is substantially free of spores, proteins, and coliform bacteria; and a whey protein concentrate. A preferred beverage product has a rice bran to whey protein concentrate in a weight ratio from about 1:3 to 3:1. The beverage product is preferably a liquid comprised of the above components with the balance being selected from water, a milk, and fruit juice.

57 Claims, No Drawings

RICE BRAN-HONEY BASED BEVERAGE PRODUCT AND PROCESS FOR MAKING SAME

FIELD OF THE INVENTION

The present invention relates to a beverage product containing rice bran, honey, and a milk component or fruit juice. A preferred rice bran is one which is defatted and stabilized against the formation of fatty acids. The present invention also relates to a reduced-calorie beverage which is also high in fiber and protein.

BACKGROUND OF THE INVENTION

The need for improved nutritious food supplements is greatly increasing as the public becomes more health and weight conscious. There are a variety of products on the market, including beverages, and mixes for making beverages, which are relatively low in calories and high in fiber and nutrients. While such products have met with various degrees of commercial success, they never-the-less contain a substantial amount of additives such as emulsifiers, stabilizers, preservatives, and the like, which would be desirable, from a nutrition point of view, to eliminate. Further, the important role that fiber plays in the diet has become increasingly recognized in recent years. The food supplement products presently on the market either do not contain enough fiber or they do not have the correct balance of soluble dietary fiber and insoluble dietary fiber. For example, most of the food supplement products contain a fiber source which is relatively low in soluble dietary fiber content. Such fiber sources are typically soy flour, oat bran, wheat flour, corn bran and cellulose, etc. These also are at a disadvantage in that only a relatively small amount can be used because higher amounts would settle out of the beverage and be undesirable to the consumer because of taste, appearance and consistency.

One source of fiber which has the proper balance of soluble dietary fiber and insoluble dietary fiber, as well as being high in vitamin and mineral content, is rice bran. Rice bran is generally not used in such food supplement products, primarily because it usually contains relatively high levels of fatty acids, phenols, and tanins, as well as other components which leave the bran with an undesirable taste. Thus, it is desirable to use rice bran which has been stabilized against the formation of fatty acids and which does not contain the other objectionable components. While stabilized rice bran is used in some commercial products, it is usually used in relatively low concentrations to avoid the undesirable effects of the components which contribute to undesirable taste. Thus, its potential for use in food products is not being met.

Further, honey, which as long been known as an excellent source of nutrients, is typically not used in beverages. This is because it has a tendency to spoil too quickly. This is due to the presence of microorganisms, such as coliform bacteria, which originate in the intestinal tract of the honey bee.

Therefore, there exist a need in the art for improved food products which can utilize the true potential of rice bran and honey. Of particular need, are those food products which are formulated to be relatively low in calories, high in fiber, and high in protein, while having substantially reduced amounts of additives, and still be palatable to the consumer.

SUMMARY OF THE INVENTION

In accordance with the present invention, there is provided a beverage product which is relatively low in calories and high in protein and dietary fiber. The beverage product is comprised of rice bran; honey which is substantially free of spores, proteins, and coliform bacteria; and a whey protein concentrate.

In a preferred embodiment of the present invention, a milk component is also present.

In another embodiment of the present invention, the beverage product is a dry blend of ingredients to which water, milk, or fruit juice can be added.

In yet another preferred embodiment of the present invention, a sweetener and/or flavoring agent is present.

In still another preferred embodiment of the present invention, the rice bran component is defatted and stabilized.

The beverage product of the present invention is preferably a liquid beverage and is comprised of about 3 to 7 wt. % rice bran; about 3 to 7 wt, % whey protein concentrate, about 3 to 7 wt. % honey, with the balance being a liquid nonfat milk or fruit juice. A sweetener, other than honey, and/or a flavoring agent, may also be used.

There is also provided a process for preparing a beverage which process comprises:

(a) preparing a mixture comprises of 3 to 7 wt. % rice bran; 3 to 6 wt. % honey which honey is substantially free of microorganisms, spores, and proteins; and 3 to 7 wt. % whey protein concentrate, with the balance being a liquid selected from the group consisting of water, milk, soy milk, and fruit juice;

(b) pasteurizing the mixture at a temperature from about 170° F. to about 300° F. for a time long enough to coagulate the proteins of the mixture; and (c) homogenizing the pasteurized mixture at pressure from about 2,000 to 20,000 psig and a temperature from about 120° F. to about 300° F.

DETAILED DESCRIPTION OF THE INVENTION

Any type of rice bran can be used in the beverage product of the present invention. Types of rice brans include: (i) full fatted, non-stabilized; (ii) full fatted, stabilized; (iii) defatted, non-stabilized; and (iv) defatted, stabilized. Preferred is a rice bran which has been defatted and stabilized. Defatted rice bran is preferred because it is lower in calories than full fatted bran. Stabilized rice bran means that it has been processed to prevent the formation of fatty acids. If a rice bran is used which has not been stabilized, then it is preferred that it only be used with a fat-containing milk component, such as whole milk. That is, the non-stabilized rice bran will first be mixed with fat-containing milk component, then left to stand for an effective amount of time. The effective amount of time will be for that amount of time which will allow the lipolytic enzymes of the rice bran to react with at least a portion of the milk fat to produce the desired taste. If the time is too long, then the lipolytic enzymes will also cause excessive formation of fatty acids which may result in a rancid tasting product, unless adequately masked. An effective amount of time will generally be from about 5 minutes to about 120 minutes, preferably from about 10 to 30 minutes, at room temperature (about 22° C.). Of course, at elevated temperatures this period of time will be shorter.

Another primary component of the beverage of the present invention is honey. Honey is typically not used in beverages, especially in milk containing beverages, because it has a tendency to spoil and to cloud within only a few days. This is because of the presence of microorganisms, such as coliform bacteria, which originate in the intestinal tract of the honey bee. The coliform bacteria cannot be destroyed by heating without severely degrading the honey, and thus, honey is usually not used in beverages. It has been found by the inventor hereof that if the honey is specially processed to eliminate substantially all contaminants, particularly microorganisms, such as the aforementioned bacteria, as well as yeasts, fungi, and molds; spores, and protein, it can be used in beverages without spoiling and clouding. A preferred method for producing the purified honey which is suitable for beverages is the method taught in co-pending U.S. patent application Ser. No. 07/707,453 entitled Protein Free Honey filed concurrent with the filing of the present application, and which is incorporated herein by reference.

Basically, the honey purification process involves first diluting the honey (raw or processed) with a diluent, such as water or a food-grade or pharmaceutical grade diluent which is either miscible with the honey or in which the honey is soluble. Non-limiting examples of such diluents, other than water, are organic solvents, preferably ethanol, and inorganic salts which are soluble in water, preferably sodium citrate. The weight ratio of honey to diluent is from about 40:60 to 60:40. This is followed by passing the diluted honey through three stages of filtration. In the first filtration stage, the honey/diluent mixture is filtered through a bed of diatomaceous earth, or any other filtering means which is capable of adsorbing colorants of the honey. This will primarily improve its color and remove any gross contaminants. The permeate is then passed through a second filtration step having a particle size cut-off of particles less than about 0.2 microns, preferably having a molecular weight cut-off of 250,000, more preferably having a molecular weight cut-off of about 100,000. This second filtration step, which can be referred to as microfiltration, removes such things as microorganisms and spores. The permeate from this second filtration step is passed through a third filter having a molecular weight cut-off 20,000 to 10,000, preferably about 15,000 to 10,000, and more preferably about 10,000. This filtration step removes the proteins. The resulting ultrafiltered diluted honey is then passed to a separation stage wherein water is separated from the mixture. One preferred way of removing water is by flash evaporation under vacuum to remove the diluent. Filters suitable for use in both the microfiltration and ultrafiltration steps are typically membrane type filters, sometimes referred to as hollow fibers, spiral wound, and ceramic filters. Any appropriate filtering means can be used in the preparation of honey. A detailed discussion of microfiltration and ultrafiltration means can be found in "Ultrafiltration Handbook" by M. Cheryan, Technomic Publishing Co., 1986.

It will be understood that the ultrafiltered honey can also be modified during the filtration process so as to produce a low sugar, or dietetic honey. This can be done by mixing an aqueous solution, preferably an aqueous solution, of a defatted, stabilized or unstabilized, rice bran, with the diluted honey prior to filtration. Of course, the desired dilution level of the honey for filtration purposes must be taken into account. That is, the entire amount of, or only a portion of, the diluent may come from the rice bran solution. The resulting honey will have a reduced glucose content when compared to raw honey. Preferably, the dietetic honey will contain less than about 25 wt. % glucose, more preferably less than about 15 wt. %, and most preferably less than about 5 wt. %. This corresponds to a dietetic honey having a honey to rice bran weight ratio of from about 40:60 to 60:40. This dietetic honey can be used in a beverage for consumers who restrict the number of calories they consume, or for consumers who, because of metabolic problems, such as diabetes, need to restrict both caloric intake and the intake of those carbohydrates which require insulin for metabolism.

Another component of the beverage of the present invention is whey protein concentrate. Whey is a by-product of the cheese industry. Typically, 10 kg of milk will give about 1 to 2 kg. of cheese depending on the variety, and about 8 to 10 kg of liquid whey. The whey is subjected to ultrafiltration to concentrate the more useful protein portion. Whey protein concentrate typically contains from about 30% to 90% by weight of protein. For purposes of the beverages of the present invention, it is preferred to use a whey protein concentrate having from about 70% to 80% protein.

It has been found by the inventor hereof that when used in the correct proportions, the fiber of the rice bran will stabilize the protein of the whey and, if present, milk, so that emulsifiers and stabilizers are not needed. This phenomenon has not been found with any other cereal fiber. Consequently, to keep the protein emulsified in the beverage, the weight ratios of rice bran to whey protein concentrate will be from about 1:3 to 3:1; preferably about 1:2 to 2:1; and more preferably about 2:3 to 3:2. Of course, if too much protein is present, it will separate out and cause the beverage to lose its texture and become undesirable from a consumer preference point of view. That is, the protein loses water and develops syneresis.

Any suitable milk or milk substitute can be used in the beverage product of the present invention. As previously discussed, it is preferred to use a milk component which is relatively high in fat, such as whole milk, only when the rice bran is not stabilized. This is because it may be desirable to allow the lipolytic enzyme in the rice bran to act on the milk fat to produce a palatable flavor, such as the flavor found in butter or cheese. The use of ingredients, such as whole milk, of course, will increase the calorie and fat content of the beverage. Therefore, because it is preferred to keep the beverage relatively low in calories and fat, nonfat milk is preferred. It is understood that a milk substitute can be used, preferably one based on other cereal legumes such as soy. In the case of a reduced-calorie beverage, the milk component and honey can be adjusted accordingly to give a total solids content of the final beverage not exceeding about 25 wt. %, and preferably not exceeding 20 wt. %.

A preferred beverage formulation is: 3–7 wt. % rice bran and 3–7 wt. % whey protein concentrate, with the total weight of rice bran plus whey protein concentrate being from about 8 wt. % to 12 wt. %, preferably from about 10 wt. % to 12 wt. %; honey adjusted in the range of about 3 to 6 wt. % depending on the total weight of the rice bran plus whey protein concentrate to give a total honey+rice+bran+whey protein concentrate of from about 14 wt. % to 16 wt. %. For reduced-calorie beverages, the total weight of solids will be kept below about 25 wt. %. Of course, the amount of honey used will also be based on the total amount of calories one desires for the final beverage. Water, milk or fruit juice will make up the balance.

It may also be desirable to include a flavoring agent and/or a non-nutritive sweetener. Non-limiting examples of such sweeteners include aspartame, saccharin and licorice root extracts. Preferred is aspartame. Of course, any other suitable food grade sweetener may be used. Non-limiting examples of flavoring agents which may be used include any of the food grade flavoring agents suitable for such beverages. Non-limiting examples of such include fruit flavors, chocolate, vanilla and the mint flavors. When used, the flavoring agent is used in an effective amount. That is, that amount which will flavor the beverage, but not so much as to overwhelm the beverage. This amount will generally not exceed about 0.1 wt. %, based on the total weight of the beverage. The sweetener will generally be used in an amount of about 0.025 wt. %, but, of course, it can be adjusted to any level of sweetness desired while keeping within the calorie requirement of the entire beverage. If desired, a preservative may also be used.

A particularly preferred liquid beverage formulation, which is reduced in calories, is one comprising:
5 to 6 wt. % rice bran
4 to 5 wt. % honey
4 to 5 wt. % whey protein concentrate
0.020 to 0.025 wt. % aspartame
0.08 to 0.12 wt. % flavoring, and
the balance being a milk product containing about 8 to 10 wt. % solids.

The term "reduced-calorie," as used herein, means a product which has at least about ⅓ fewer calories than the food for which it can be substituted. The reduced-calorie beverages of the present invention will contain from about 120 to 200 calories per eight ounce serving.

As previously mentioned, fruit juice may be substituted for the milk component. The solids content of the fruit juice is substantially the same as that of the milk component. Therefore, it will make up the balance of the beverage just as a milk component will, taking into consideration that the total solids content for a reduced-calorie beverage should not exceed about 25 wt. %.

The beverage product of the present invention can be a dry blend, a concentrate, or a liquid beverage. If it is a dry blend, it can only contain the rice bran, honey, and whey protein concentrate components. These components can be added to any suitable liquid, such as water, milk, or fruit juice, to form a beverage. The dry blend can be prepared by any suitable method. One suitable method is to merely blend the ingredients and dry them to the appropriate moisture level. For example, about 3 to 12 wt. % of the dry blend will still be water after drying.

The dry blend can also be prepared by adding the ultrafiltered honey and rice bran to the liquid whey protein concentrate. The resulting blend can then be spray dried by any suitable conventional spray drying technique. Of course, any additional dry ingredient can be added to the blend either before or after drying.

A preferred method of producing a liquid beverage of the present invention is to first form a liquid mixture of all of the ingredients, followed by heating the mixture to an effective temperature and time to pasteurize the mixture and to coagulate the proteins in the mixture. This heating step will generally be done at temperatures between about 170° F. and 300° F.

The pasteurized mixture is then homogenized by pressurizing it at a suitable pressure. Such pressure will be from about 2,000 to 20,000 psig, preferably from about 2,000 to about 14,000 psig, and more preferably from about 2,000 to about 8,000 psig. The homogenization step will be conducted for a period of time to effect homogenization of the components of the mixture. While ambient temperatures are preferred during the homogenization step, it is understood that the temperature can range from about 120° F. to about 300° F., preferably from about 140° F. to about 200° F.

It will be noted that by conventional techniques milk based beverages are typically homogenized first and then pasteurized.

Having, thus described the present invention, the following examples are presented for illustrative purposes and are not to be taken as limiting the invention in anyway.

EXAMPLE 1

100 gallons of unpasteurized skim milk with a fat content of 0.5 wt. % were added to a 400 gallon steam jacketed tank. 60 pounds of defatted, stabilized rice bran, 55 pounds of ultrafiltered honey, and 45 pounds of whey protein concentrate (75% protein) was added to the milk. The ultrafiltered honey was substantially free of bacteria, spores, and protein. The mixture was heated to 170° F. and allowed to remain at that temperature for 10 minutes. It was then homogenized through a Gaulin two stage homogenizer with the first stage being at 500 psig and the second stage being at 2,000 psig.

The product was cooled in a refrigerated tank and 4 ounces of Aspartame (Nutrisweet) and 1000 ml of vanilla (Melipone, Ronald Reginald, New Orleans, La.) were added to the tank during agitation. When the product reached 60° F., it was packaged in 8 ounce Pure Pak cartons and stored at a temperature of about 36° F. Taste panel results showed overall preference for the product over existing sweetened milk-based drinks. The resulting beverage was analyzed and was found to contain:

| | | |
|---|---|---|
| Weight/Unit | 240 | grams |
| Calories | 170 | |
| Protein | 18 | grams |
| Fiber | 8 | grams |
| Fat | 1.5 | grams |
| Carbohydrate | 27 | grams |
| Solids | 23% | |

EXAMPLE 2

60 grams of stabilized defatted rice bran were mixed with 45 grams of whey protein concentrate and 55 grams of ultrafiltered honey. That is, honey which is substantially free of microorganisms, spores and proteins. This mixture was mixed with 1000 ml. of skim milk and heated to 180° F. for 10 minutes in a glass bottle 10 cm high, 1 liter bottle. The bottle was placed in a refrigerator at 40° F. and allowed to cool.

The above procedure was repeated for: 112 g of oat bran; 140 g of wheat bran, 60 g of soy bran and 110 g of corn bran. The specific amount of bran was chosen to represent 3.5 wt. % dietary fiber. The results are shown in the table below.

After 4 hours at 40° F. the bottles were examined for separation.

The experiment was repeated using the stabilizers: 0.25% Dariloid 280 (xanthan gum, monoglycerides, polysorbate 80, and carrageenan).

| BRAN | HEIGHT OF BOTTOM BRAN LAYER IN CENTIMETERS | |
| --- | --- | --- |
| | Without Stabilizers | With Stabilizers |
| Rice | 0.5 | 0.5 |
| Oat | 1.5 | 1.0 |
| Wheat | 3.0 | 2.5 |
| Soy | 2.5 | 2.0 |
| Corn | 3.0 | 2.5 |

The above table evidences the fact that rice bran is the only cereal bran which will stabilize the proteins so that the addition of stabilizers is not needed.

What is claimed is:

1. A powdered beverage product comprised of rice bran which has been stabilized against the production of fatty acids; honey which has not been degraded by heating and which is substantially free of one or more of the substances selected from the group consisting of coliform bacteria, spores, and proteins, all of which originated in the intestinal tract of the honey bee; and whey protein concentrate.

2. The beverage product of claim 1 wherein a powdered milk component is present.

3. The beverage product of claim 2 wherein the milk component is a nonfat milk.

4. The beverage product of claim 2 wherein the milk component is a soy based milk substitute.

5. The beverage product of claim 1 wherein a powdered fruit juice component is present.

6. The beverage product of claim 1 wherein the rice bran is defatted and stabilized.

7. The beverage product of claim 6 wherein another component is present and is selected from the group consisting of a powdered milk component and a powdered fruit juice component.

8. The beverage product of claim 7 which also contains a sweetener and/or flavoring agent.

9. The beverage product of claim 8 wherein the sweetener is aspartame.

10. The beverage product of claim 1 wherein the weight ratio of rice bran to whey protein concentrate is from about 1:3 to 3:1.

11. The beverage product of claim 10 wherein the weight ratio of rice bran to whey protein concentrate is from about 1:2 to 2:1.

12. The beverage product of claim 7 wherein the weight ratio of rice bran to whey protein concentration is from about 1:3 to 3:1.

13. The beverage product of claim 11 wherein the concentration of components is about 30 wt. % to 70 wt. % rice bran, about 30 wt. % to 70 wt. % whey protein concentrate, and about 30 wt. % to 60 wt. % honey.

14. The beverage product of claim 12 wherein the concentration of components is about 30 wt. % to 70 wt. % rice bran, about 30 wt. % to 70 wt. % whey protein concentrate, and about 30 wt. % to 60 wt. % honey.

15. The beverage product of claim 2 wherein the rice bran is defatted and stabilized a non-nutritive sweetener and/or flavoring agent is present, and the weight ratio of rice bran to whey protein concentrate is about 1:3 to 3:1.

16. A liquid beverage comprised of rice bran, honey which is substantially free of coliform bacteria, spores, and proteins; and whey protein concentrate, with the balance being water, liquid milk component, or fruit juice.

17. The beverage of claim 16 wherein the milk component is a nonfat milk.

18. The beverage of claim 16 wherein the milk component is a soy based milk substitute.

19. The beverage of claim 16 wherein the rice bran is defatted and stabilized.

20. The beverage of claim 19 which also contains a sweetener and/or flavoring agent.

21. The beverage of claim 20 wherein the sweetener is aspartame.

22. The beverage of claim 16 wherein the weight ratio of rice bran to whey protein concentrate is from about 1:3 to 3:1.

23. The beverage of claim 22 wherein the weight ratio rice bran to whey protein concentrate is from about 1:2 to 2:1.

24. The beverage of claim 19 wherein the weight ratio of rice bran to whey protein concentrate is from about 1:3 to 3:1.

25. The beverage of claim 20 wherein the weight ratio of rice bran to whey protein concentrate is from about 1:3 to 3:1.

26. The beverage of claim 22 wherein the concentration of components is about 3 wt. % to 7 wt. % rice bran, about 3 wt. % to 7 wt. % whey protein concentrate, and about 3 wt. % to 6 wt. % honey, with the balance being a milk or fruit juice.

27. The beverage of claim 25 wherein the concentration of components is about 3 wt. % to 7 wt. % rice bran, about 3 wt. % to 7 wt. % whey protein concentrate, and about 3 wt. % to 6 wt. % honey, with the balance being a nonfat milk or fruit juice.

28. The beverage of claim 27 which also contains a sweetener and/or food-grade flavoring agent.

29. The beverage of claim 28 wherein the sweetener is selected from the group consisting of aspartame, saccharin and licorice root extract.

30. A reduced-calorie beverage which is comprised of 3 to 6 wt. % of a defatted stabilized rice bran, 3 to 5 wt. % honey which is substantially free of coliform bacteria, spores and proteins, and 3 to 4 wt. % whey protein concentrate, and wherein the weight ratio of rice bran to whey protein concentrate is about 1:3 to 3:1, which weight percents are based on the total weight of the beverage, with the balance being water, and with the proviso that the solids content of the beverage not exceed about 25 wt. %.

31. The beverage of claim 30 wherein a non-fat milk component is substituted for water.

32. The beverage of claim 30 wherein a defatted soy based milk substitute is substituted for the water.

33. The beverage of claim 30 wherein a fruit juice is substituted for the water.

34. The beverage of claim 30 which also contains a sweetener and/or flavoring agent.

35. The beverage of claim 34 wherein the sweetener is aspartame.

36. The beverage of claim 30 wherein the weight ratio rice bran to whey protein concentrate is from about 1:2 to 2:1 and a sweetener and/or flavoring agent is present.

37. The beverage of claim 31 wherein the weight ratio of rice bran to whey protein concentration is from about 1:2 to 2:1 and a sweetener and/or flavoring agent is present in an effective amount.

38. The beverage of claim 33 wherein the weight ratio of to whey protein concentrate is from about 1:2 to 2:1 and a sweetener and/or flavoring agent is present.

39. The beverage of claim 37 in which the total solids content is less than 20 wt. %.

40. The beverage of claim 38 wherein the total solids less than 20 wt. %.

41. A process of preparing a beverage, which process comprises:
 (a) preparing a mixture comprised of about 3 to 7 wt. % rice bran, about 3 to 6 wt. % honey which honey is substantially free of coliform bacteria, spores, and proteins, and about 3 to 7 wt. % whey protein concentrate, with the balance being a liquid selected from the group consisting of water, milk, soy milk, and fruit juice;
 (b) pasteurizing the mixture at a temperature from about 170° F. to about 300° F. for a time long enough to coagulate the proteins of the mixture; and
 (c) homogenizing the pasteurized mixture at pressures from about 2000 to 20,000 psig and at a temperature from about 120° F. to about 300° F.

42. The process of claim 41 wherein the homogenization is conducted at pressures from about 2,000 to about 8,000 psig and at a temperature from about 140° F. to about 200° F.

43. The process of claim 42 wherein a sweetener and/or flavoring agent is added in step (a).

44. The process of claim 43 wherein a sweetener is present and is selected from the group consisting of aspartame, licorice root extracts, and saccharin.

45. The process of claim 44 wherein the sweetener is aspartame.

46. The process of claim 44 wherein a flavoring agent is present and is selected from the group consisting of fruit flavors, chocolate, vanilla, and mint flavors.

47. The process of claim 42 wherein the homogenized mixture is spray dried to produce a powdered beverage product.

48. The process of claim 43 wherein the homogenized mixture is spray dried to produce a powdered beverage product.

49. The beverage product of claim 11 wherein the weight ratio of rice bran to whey protein concentrate is from about 1 to 1.

50. The beverage product of claim 12 wherein the weight ratio of rice bran to whey protein concentrate is from about 1 to 1.

51. The beverage product of claim 14 wherein the weight ratio of rice bran to whey protein concentrate is from about 1 to 1.

52. The beverage product of claim 23 herein the weight ratio of rice bran to whey protein concentrate is from about 1 to 1.

53. The beverage product of claim 24 wherein the weight ratio of rice bran to whey protein concentrate is from about 1 to 1.

54. The beverage product of claim 25 wherein the weight ratio of rice bran to whey protein concentrate is from about 1 to 1.

55. The beverage product of claim 36 wherein the weight ratio of rice bran to whey protein concentrate is from about 1 to 1.

56. The beverage product of claim 37 wherein the weight ratio of rice bran to whey protein concentrate is from about 1 to 1.

57. The beverage product of claim 38 wherein the weight ratio of rice bran to whey protein concentrate is from about 1 to 1.

* * * * *